United States Patent
Anwar et al.

(10) Patent No.: US 11,132,210 B2
(45) Date of Patent: Sep. 28, 2021

(54) DYNAMIC PARALLELISM ADJUSTMENT

(71) Applicant: International Business Machines Corporation, Armonk, NY (US)

(72) Inventors: Ali Anwar, San Jose, CA (US); Mohamed Mohamed, San Jose, CA (US); Samir Tata, Santa Clara, CA (US); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 16/407,442

(22) Filed: May 9, 2019

(65) Prior Publication Data

US 2020/0356387 A1 Nov. 12, 2020

(51) Int. Cl.
*G06F 9/44* (2018.01)
*G06F 9/445* (2018.01)

(52) U.S. Cl.
CPC ................ *G06F 9/44578* (2013.01)

(58) Field of Classification Search
CPC ............ G06F 9/4478; G06F 9/44578
See application file for complete search history.

(56) References Cited

U.S. PATENT DOCUMENTS

| | | | | |
|---|---|---|---|---|
| 2004/0172476 A1* | 9/2004 | Chapweske | ........... | H04L 67/325 709/231 |
| 2011/0061057 A1* | 3/2011 | Harris | ................... | G06F 9/5072 718/104 |
| 2016/0182315 A1* | 6/2016 | Salokanto | ........... | H04L 41/5054 709/226 |
| 2017/0078451 A1 | 3/2017 | Wills et al. | | |
| 2017/0177860 A1 | 6/2017 | Suarez et al. | | |
| 2017/0180346 A1* | 6/2017 | Suarez | ........... | G06F 8/71 |
| 2017/0185542 A1* | 6/2017 | Batley | ........... | G06F 13/1642 |
| 2017/0220329 A1 | 8/2017 | Yang et al. | | |
| 2017/0244606 A1* | 8/2017 | Htay | ........... | H04L 47/2475 |

FOREIGN PATENT DOCUMENTS

WO 2017100769 A1 6/2017

OTHER PUBLICATIONS

Nathan et al. (CoMICon: A Co-operative Management System for Docker Container Images), IEEE (Year: 2017).*
Rouse, M., "container image," TechTarget, Feb. 2018, 5 pages, retrieved from searchitoperations.techtarget.com/definition/container-image.

(Continued)

*Primary Examiner* — Chat C Do
*Assistant Examiner* — Lenin Paulino
(74) *Attorney, Agent, or Firm* — Zilka-Kotab, P.C.

(57) ABSTRACT

A computer-implemented method includes receiving characteristics of available resources usable for downloading layers of a container image and fetching a manifest of the container image from a container registry. The method includes determining layers of the container image to be downloaded based on the manifest and, based on the characteristics of the available resources and sizes of the layers to be downloaded, adjusting an optimal parallelism to download the layers. The method includes downloading the layers.

20 Claims, 7 Drawing Sheets

(56) References Cited

OTHER PUBLICATIONS

Harter et al., "Slacker: Fast Distribution with Lazy Docker Containers," Proceedings of the 14th USENIX Conference on File and Storage Technologies (FAST '16), Feb. 2016, pp. 181-195.

Anwar et al., "MOS: Workload-aware Elasticity for Cloud Object Stores," Proceedings of the 25th ACM International Symposium on High-Performance Parallel and Distributed Computing (HPDC '16), May-Jun. 2016, 12 pages.

Anwar et al., "Taming the Cloud Object Storage with MOS," Proceedings of the 10th Parallel Data Storage Workshop (PDSW '15), Nov. 2015, 6 pages.

Anwar et al., "Improving Docker Registry Design based on Production Workload Analysis," Proceedings of the 16th USENIX Conference on File and Storage Technologies, Feb. 2018, pp. 265-278.

Nathan et al., "CoMICon: A Co-operative Management System for Docker Container Images," IEEE International Conference on Cloud Engineering, 2017, pp. 116-126.

Anonymous, "NIST Cloud Computing Program," NIST, Information Technology Laboratory, Nov. 13, 2013, pp. 1-2, retrieved from nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from csrc.nist.gov/projects/cloud-computing.

\* cited by examiner

```
// X1 is tunable factor with recommended default value of 0 to 3
// start with downloading at least X1 number of layers
P = X1
requested_layers_size = sum of first P layers size while (sorted_layers_list != empty) {
    // X2 is tunable factor with recommended default value of 1 to 2
    // fetch total data equal to X2 times the network bandwidth
    if (requested_layers_size < available NW BW * X2) {
        if (CPU is not bottleneck && Storage speed is not bottleneck) {
            P = P + 1
        }
    }
    else {
        // download P layers in parallel
        for (first P layers in sorted_layers_list) {
            if (layer not already being downloaded) {
                download layer
            }
        }
        // recalculate the parallelism when a layer download is complete
        wait (until any download complete) {
            remove the fetched layer from the sorted_layers_list
            requested_layers_size -= size of downloaded layer
        }
    }
}
```

DYNAMIC PARALLELISM ADJUSTMENT

BACKGROUND

The present invention relates to container images, and more specifically, this invention relates to dynamically adjusting parallelism for pulling container images from container registries in cloud storage systems and networks.

SUMMARY

A computer-implemented method, according to one embodiment, includes receiving characteristics of available resources usable for downloading layers of a container image and fetching a manifest of the container image from a container registry. The method includes determining layers of the container image to be downloaded based on the manifest and, based on the characteristics of the available resources and sizes of the layers to be downloaded, adjusting an optimal parallelism to download the layers. The method includes downloading the layers.

A computer program product for dynamically adjusting parallelism for pulling container images from container registries, according to one embodiment, includes a computer readable storage medium having program instructions. The program instructions are executable by a computer to cause the computer to perform the foregoing method.

A system, according to one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically adjusting parallelism for pulling container images from container registries.

In one general embodiment, a computer-implemented method includes receiving characteristics of available resources usable for downloading layers of a container image and fetching a manifest of the container image from a container registry. The method includes determining layers of the container image to be downloaded based on the manifest and, based on the characteristics of the available resources and sizes of the layers to be downloaded, adjusting an optimal parallelism to download the layers. The method includes downloading the layers.

In another general embodiment, a computer program product for dynamically adjusting parallelism for pulling container images from container registries includes a computer readable storage medium having program instructions. The program instructions are executable by a computer to cause the computer to perform the foregoing method.

In another general embodiment, a system includes a processor and logic integrated with the processor, executable by the processor, or integrated with and executable by the processor. The logic is configured to perform the foregoing method.

Figure 1:
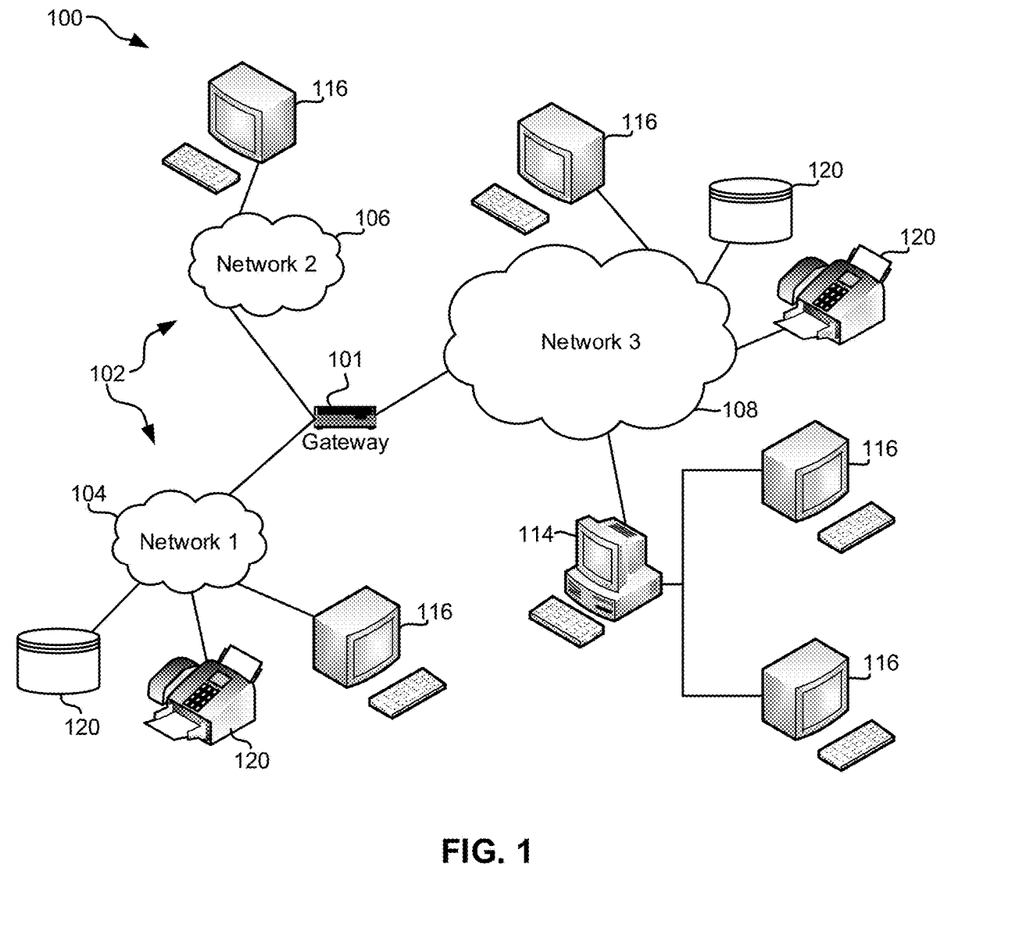
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
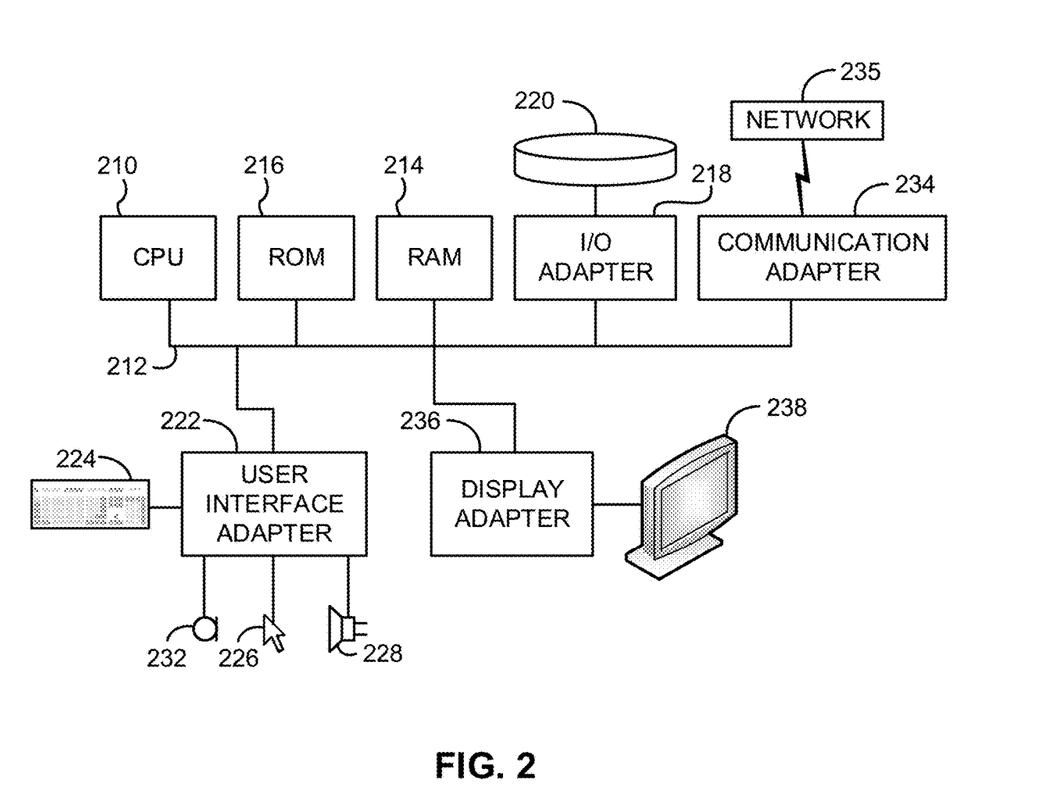
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
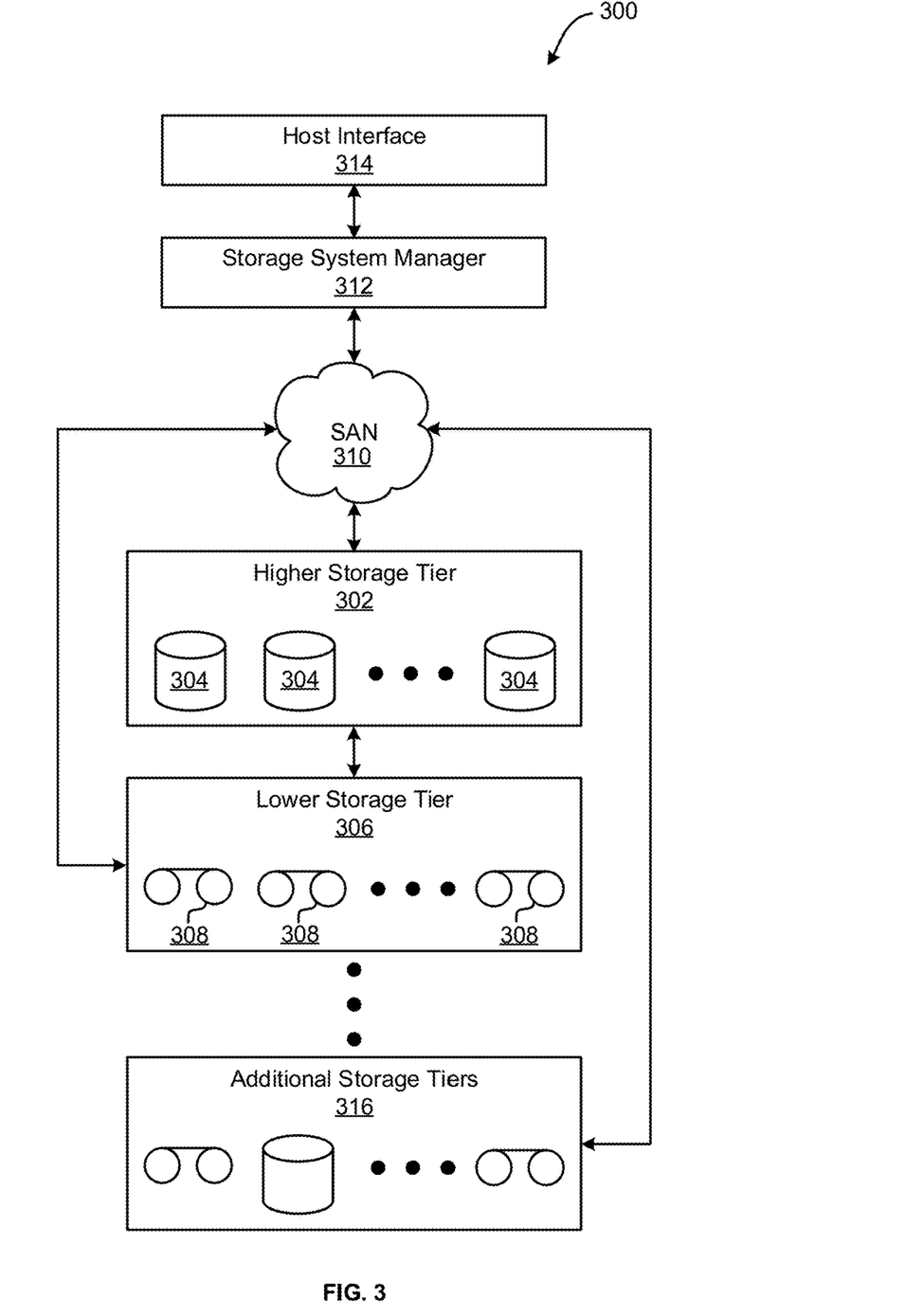
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Containers are logical constructs of space comprising one or more volumes. Containers are lightweight, standalone, executable software packages which may be portable irrespective of the operating system (OS) and/or kernel environments. Containers may be an abstraction of the application layer which packages code and/or dependencies together. Multiple containers may be running on the same machine where the containers share an OS. Each container may run an isolated process within the user space.

Container images are static files which include executable code for running isolated processes on information technology (IT) infrastructure. Container images may be stored in online stores (e.g., container registries). Each container image is a combination of manifest (e.g., metadata including information about the container image layers, size, digest, operating system (OS), architecture, runtime requirements, etc.) and various layers (e.g., compressed tar files). The various components of the layers of the container image are often reused by multiple images to save disk space and reduce the time to build images.

Conventional approaches for pulling container images from a container registry include fetching a manifest from the registry in order to determine which layers are required for running the container image. Layers which are not locally available are conventionally fetched from the registry a default number of layers at a time (e.g., for example, 3 layers at a time). All of the layers are extracted and decompressed locally. The default number of layers may be controlled by the user in response to starting a client side container daemon. The container daemon may be responsible for fetching the manifest and layers from the online registry for the container image.

Users have varying network bandwidths, computing power, storage speeds, etc. Layers also vary greatly in size. Relatively larger layers may require better network bandwidth (e.g., less connections may be sufficient). Relatively smaller layers use more network connections because the computing is more intensive. Relatively smaller layers may be fetched in larger numbers in parallel for various approaches. Various storage speeds may create bottlenecks in performance depending on the sizes of the layers. For example, fetching a plurality of relatively larger layers may choke the bandwidth by pulling too much at a time. Conventional approaches for fetching fixed numbers of layers at a time are inefficient in terms of time and/or resources required to download the layers. Variations in layer size among different container images make fetching fixed numbers of layers at a time inefficient in terms of the time required to pull all the missing layers. Most of the time spent on the process is often spent pulling the various layers from one or more container registries.

In one conventional approach, layers are not fetched. The layers are available via a network file system (NFS) registry-type service from which the files are directly read as needed. Constant network connectivity is required in this approach during the lifecycle of the container which results in an unreliable and/or inefficient pulling process.

In another conventional approach, peer-to-peer (P2P) computing is used to fetch missing layers from peers as an alternative to a centralized registry. P2P networks also fetch a default number of layers at a time. P2P networks experience the same delay and/or inefficiency as traditional pulling approaches from container image registries. P2P networks may be additionally at risk for compromised security.

For various embodiments disclosed herein, "small layers" and "relatively smaller layers" as referred to throughout the present disclosure may refer to layers in size from about 1 KB to about 1 MB. "Large layers" and "relatively larger layers" as referred to throughout the present disclosure may refer to layers in size from about 100 MB to about 10 GB.

Various embodiments as described herein reduce the time to pull a container image from a registry. At least some of the embodiments disclosed herein provide for faster deployment of containers by reducing the time to fetch layers from the registry and/or reducing startup time to run a container. The various embodiments reduce the time to pull a container image as a whole (e.g., the amount of time required to pull a container image from the container registry). Further benefits provided by various embodiments include the ability to customize and/or adjust the parallelism for fetching images from multiple registries according to the network bandwidth for each registry.

Figure 4:
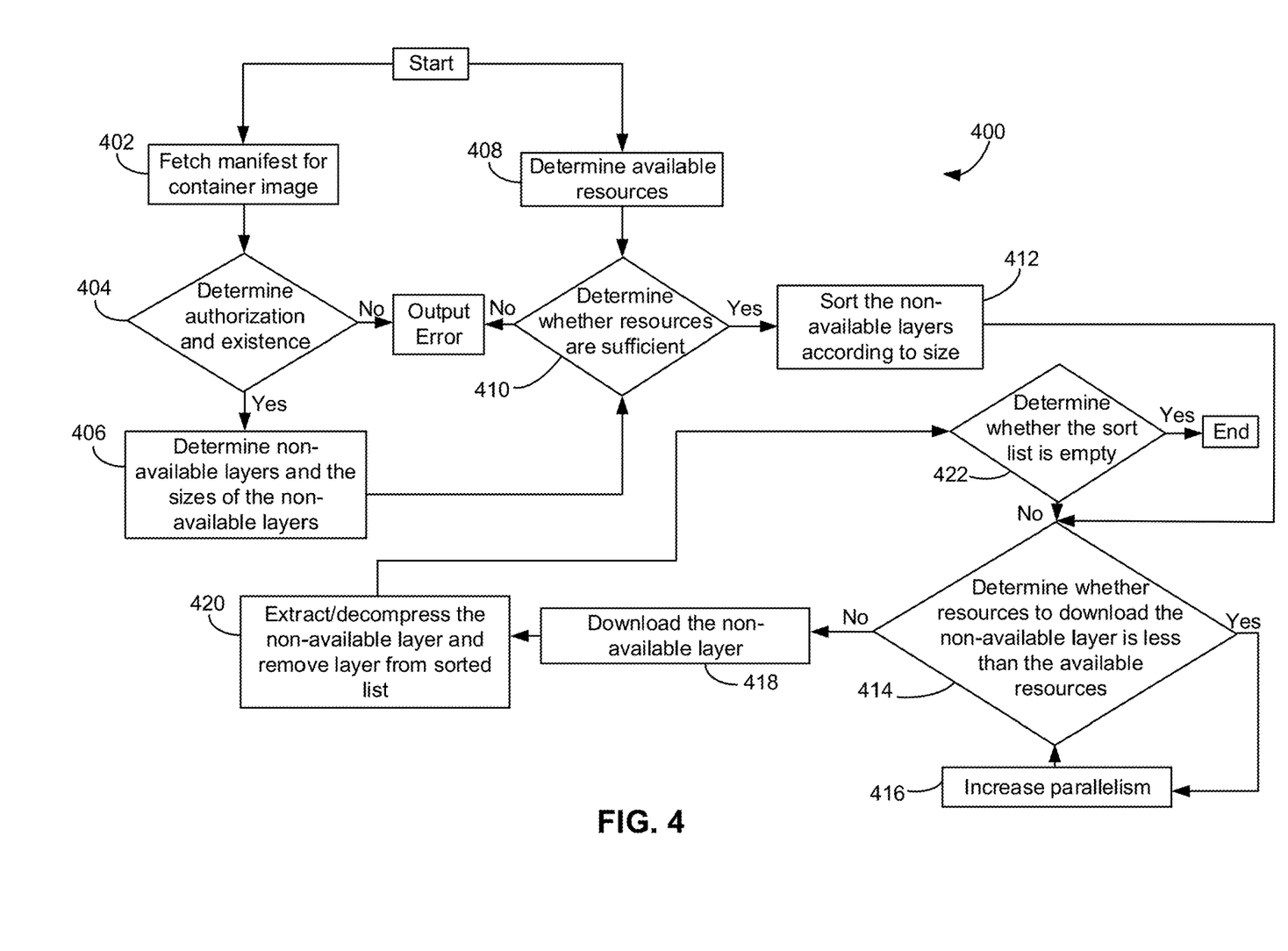
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402 which includes fetching the manifest for a container image from a container registry. The container registry may be an Azure Container Registry, Docker Hub, IBM Cloud Container Registry, etc. The manifest for the container image may include metadata including information about the container image layers, size, size of the layers, digest, operating system (OS), architecture, runtime requirements, etc. Fetching the manifest may be performed using any technique known in the art.

In another configuration, various operations of method 400 may be performed in the context of fetching container images in a P2P network. The parallelism may be similarly adjusted as described below for pulling container images and downloading non-available layers in a P2P network as would be understood by one having ordinary skill in the art upon reading the present disclosure.

Decision block 404 includes determining whether the user and/or user specific configuration is authorized for the manifest. The user specific configuration may include one or more user devices in various configurations. If the user and/or user specific configuration is not authorized, the container registry service may output an error. An error message may be output in any manner known in the art. If the user and/or specific user configuration is authorized, the method 400 may proceed to operation 406. Authorization enables access to the manifest and/or information derived from the manifest as would be understood by one having ordinary skill in the art.

In other approaches, the method 400 includes verifying the existence of the manifest. If the manifest file is verified, the container registry service may serve the manifest file to the user. If the manifest file is not verified, the container registry service may output an error. An error message may be output in any manner known in the art.

Operation 406 includes determining non-available layers and the sizes of the non-available layers. In some approaches, non-available layers refers to layers which are not locally available. In a preferred approach, locally available layers are layers which are available on the client side system. Layers that are not available locally may refer to any layers to be downloaded. In response to fetching the manifest, the manifest may be parsed to determine which layers comprise the container image. Parsing the manifest may include determining which layers are locally available and whether there are any missing layers (e.g., non-available layers).

In some approaches, operation 406 includes, for each non-available layer, determining from the registry service whether the layer exists and determining the size of each non-available layer. In a preferred approach, the size of each layer may be recorded in the manifest file and derived from the manifest. In another approach, the size of each layer may be fetched using the HEAD API call to the registry service.

Operation 408 includes determining available resources associated with a user specific configuration. Determining available resources associated with a user specific configuration may include receiving characteristics of available resources which are usable for downloading layers of a container image. Available resources may include network bandwidth, computational capacity, storage available, storage speed, etc. Available resources may be determined by user input and/or any monitoring system known in the art. In one configuration, operation 408 may be performed substantially simultaneously with operation 402, 404, and/or 406. In another approach, operation 408 may be performed sequentially after operation 402, 404, and/or 406.

Decision block 410 includes determining whether the available resources are sufficient. Determining whether the available resources are sufficient may include analyzing the characteristics of the available resources and comparing the available resources to the resource requirements for downloading the non-available layers. In one approach, determining whether the available resources are sufficient includes determining that there is sufficient storage space to store the non-available layers in an uncompressed form. In another approach, determining whether the available resources are sufficient includes determining that the network connectivity is sufficiently reliable and/or stable to download the non-available layers. In yet another approach, determining whether the available resources are sufficient includes determining that the computational capacity is sufficient to download and extract the non-available layers. Determining whether the available resources are sufficient (e.g., compared to the resource requirements for downloading the non-available layers) may include any combination of the foregoing considerations in addition to any other resource constraints. If the available resources are sufficient, the method proceed to operation 412. In one approach, the available resources are sufficient if the resource requirements are less than or equal to the available resources. If the available resources are insufficient, an error message may be output in any manner known in the art. In one approach, the available resources are insufficient if the resource requirements are greater than the available resources.

Operation 412 includes sorting the non-available layers in increasing and/or decreasing order of size. Any known sorting algorithm available to one having ordinary skill in the art may be used to sort the sizes of the non-available layers in an increasing and/or decreasing order. In various approaches, operation 412 includes generating a sorted list.

Decision block 414 includes determining whether the resources to download one of the non-available layers are less than the available resources. Determining whether the resources to download one or more the of non-available layers are less than the available resources may include considering whether the available network bandwidth is sufficient to download the layer(s) such that a bottleneck will not occur. In another approach, determining whether the resources to download one or more the of non-available layers are less than the available resources may include considering whether the available storage speed of a device is sufficient to download the layer(s) such that a bottleneck will not occur. In yet another approach, determining whether the resources to download one or more the of non-available layers are less than the available resources may include considering whether the available computational capacity is sufficient to handle the parallel network connections such that a bottleneck will not occur. Determining whether the resources are sufficient may include any combination of the foregoing considerations in addition to any other resource constraints.

If the resources to download one of the non-available layers are less than the available resources, the method proceeds to operation 416. If the resources to download one of the non-available layers are greater than the available resources, the method proceeds to operation 418.

Operation 416 includes increasing the parallelism. Increasing the parallelism includes increasing the number of layers to download in parallel. The optimal parallelism may be increased for relatively smaller layers in some approaches where relatively smaller layers may be downloaded in larger numbers in parallel. The number of layers may be increased one layer at a time, more than one layer at a time, a set number of layers at a time, etc. In response to increasing the number of layers to download in parallel by at least one layer, the method 400 may return to decision block 414 in order to determine whether the resources to download the plurality of layers are less than the available resources. The method may iterate between operation 416 and decision block 414 until decision block 414 determines that the resources to download the plurality of layers are greater than the available resources. In response to determining that the resources to download the plurality of layers are greater than the available resources, the method proceeds to operation 418.

In some approaches, operation 416 may include decreasing the parallelism in response to determining that the resources to download the plurality of layers are greater than the available resources. The optimal parallelism may be decreased for relatively larger layers which may choke the bandwidth of the client system. In various configurations, the optimal parallelism is adjusted based on the characteristics of the available resources and the sizes of the layers to be downloaded. Adjusting the optimal parallelism may include increasing or decreasing the optimal parallelism.

In preferred approaches, the optimal parallelism is dynamically adjusted to download the non-available layers for the container images. The optimal parallelism may be updated continuously, periodically, every set number of layers, etc. In a preferred approach, the optimal parallelism is updated in response to completion of downloading at least one layer. Dynamically adjusting the parallelism may include determining an optimal number of non-available layers to download based on the available resources of the client system. In various approaches, the parallelism may be increased for downloading relatively smaller non-available layers. In other approaches, the parallelism may be decreased for downloading relatively larger non-available layers. In one approach, adjusting the optimal parallelism for downloading the layers includes not increasing the parallelism in response to one or more of the available resources becoming a bottleneck. An optimal parallelism may include an optimal number of non-available layers which is a number of layers which may be downloaded in parallel without causing a bottleneck to occur.

Operation 418 includes downloading the layer or plurality of layers in parallel as would be understood by one having ordinary skill in the art upon reading the present disclosure.

Operation 420 includes extracting and decompressing the layer. Extracting and decompressing the layer may be performed using any technique known in the art. Operation 420 may include removing the layer from the sorted list generated in operation 412. The sorted list may be substantially continuously updated to reflect removal of the downloaded layers.

Decision block 422 includes determining whether the sorted list generated in operation 412 is empty. If the sorted list is empty, method 400 ends. If one or more non-available layers remain in the sorted list, the method 400 proceeds to decision block 414 and reiterates the various operations until decision block 422 determines the sorted list is empty.

In various configurations, the optimal parallelism may be updated in response to completion of downloading at least one layer. The updating may be performed substantially simultaneously or sequentially with any one of or combination of operations 414-422.

Figure 5:
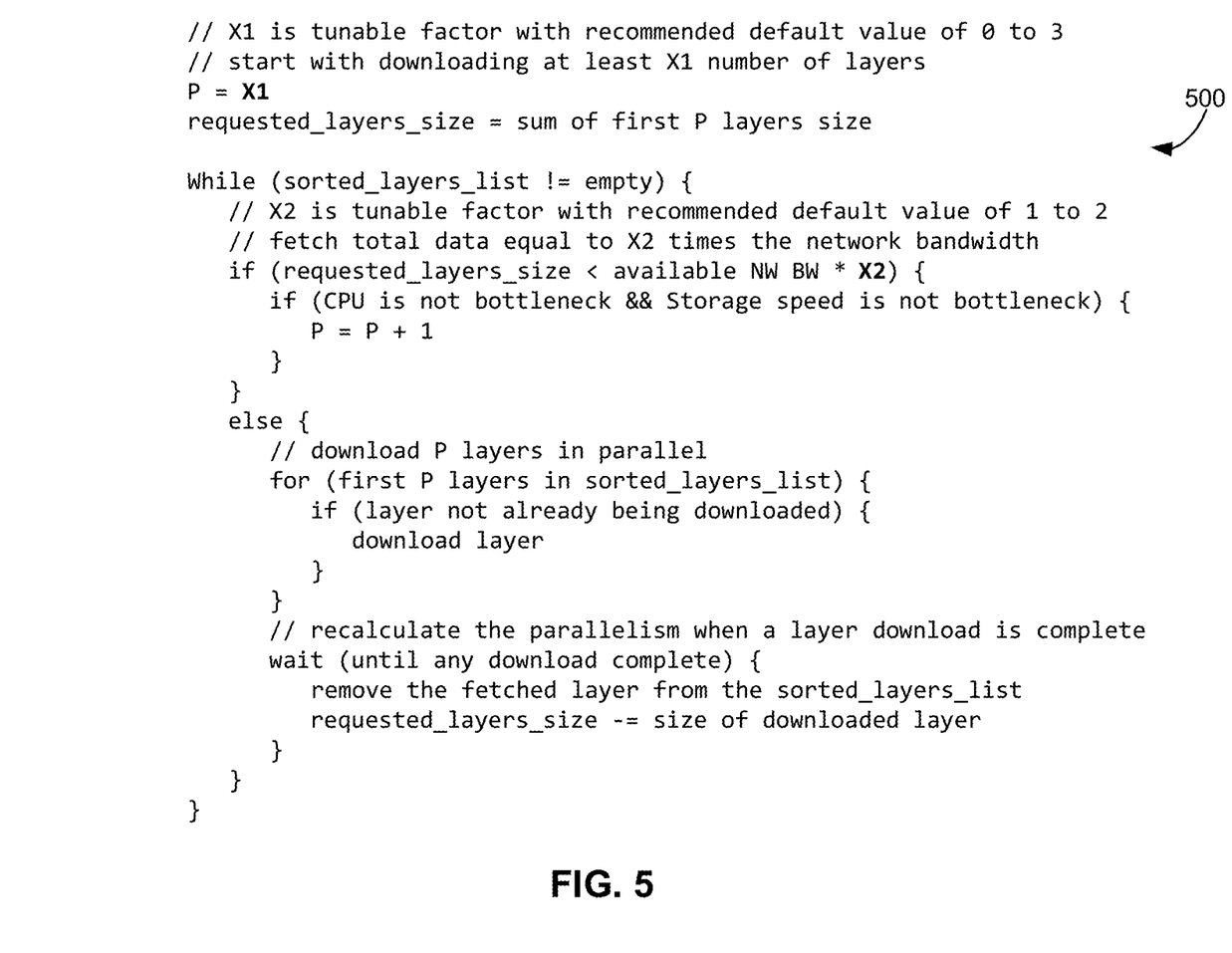
FIG. 5 is an exemplary algorithm for performing various operations of the method presented in FIG. 4, in accordance with one embodiment of the present invention.

As shown by way of example in FIG. 5, an exemplary algorithm 500 may be used for performing various operations of method 400. Specifically, the algorithm 500 may be used for determining the parallelism according to decision block 414 and operation 416.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
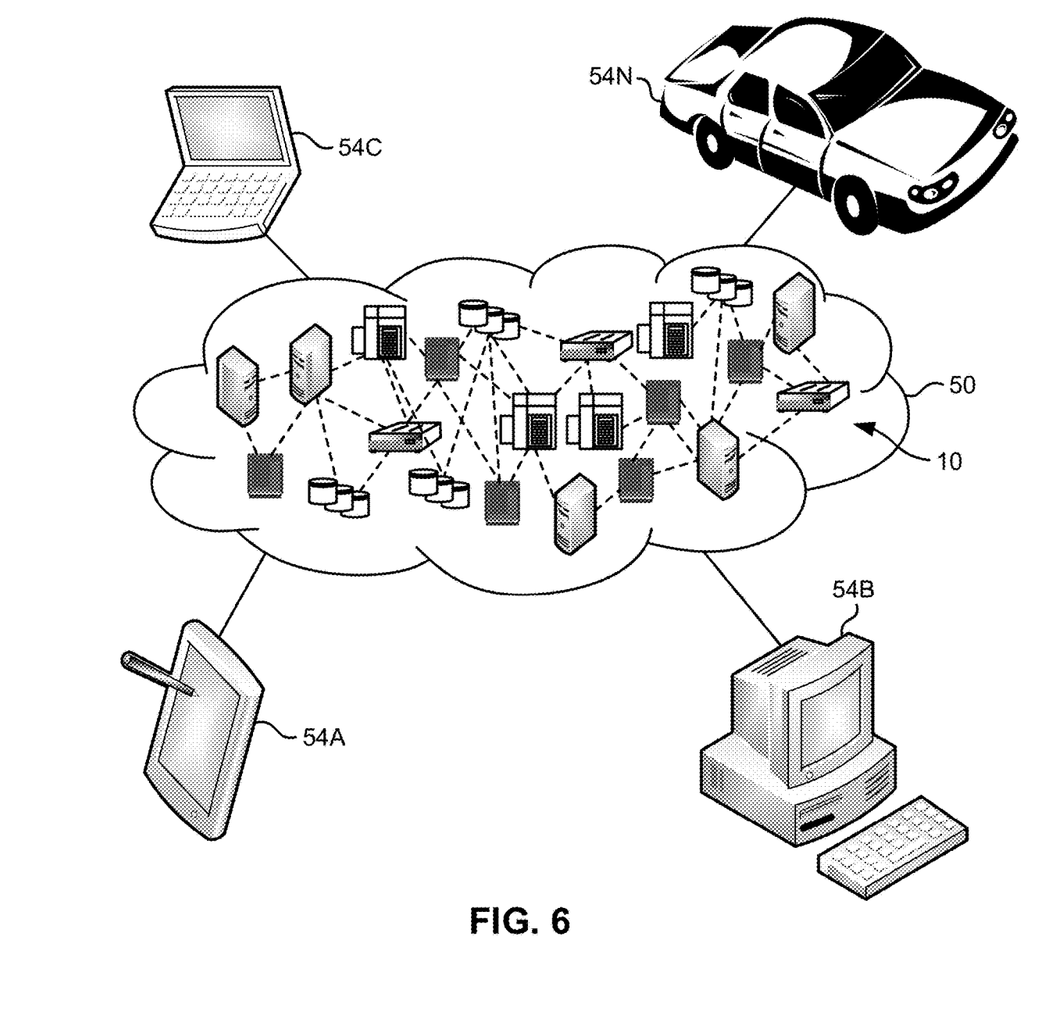
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
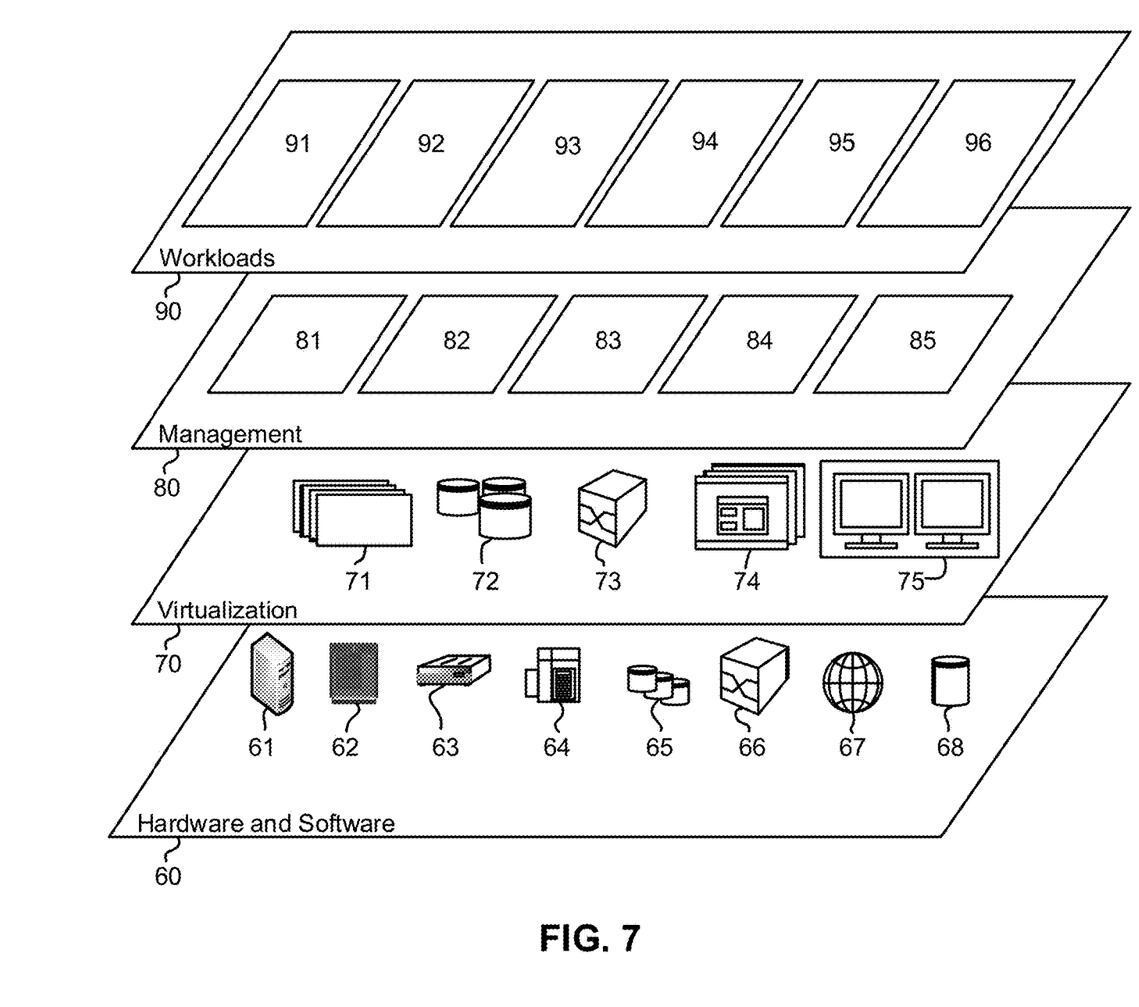
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic parallelism adjustment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving characteristics of available resources usable for downloading layers of a container image, wherein the available resources are compared to resource requirements for downloading the layers, wherein the characteristics include at least one characteristic selected from the group consisting of: a network bandwidth and storage speed;
in response to determining that the resource requirements are less than or equal to the available resources, sorting the layers by size for generating a sorted list;
fetching a manifest of the container image from a container registry, wherein the manifest of the container image includes metadata at least about the layers of the container image, sizes of the layers of the container image, digests, operating systems (OS), architectures, and runtime requirements;

determining layers of the container image to be downloaded based on the manifest, wherein the fetching and the determining are performed substantially simultaneously as the receiving the characteristics of available resources usable for downloading the layers of the container image;

based on the characteristics of the available resources and the sizes of the layers to be downloaded, adjusting an optimal parallelism to download the layers, wherein adjusting the optimal parallelism reduces an amount of time to pull the container image from the container registry, wherein adjusting the optimal parallelism includes determining an optimal number of layers to download in parallel without causing a bottleneck to occur, wherein the optimal parallelism is adjusted in response to downloading a predefined number of the layers; and downloading the layers.

2. The computer-implemented method of claim 1, wherein the layers to be downloaded are layers which are not locally available.

3. The computer-implemented method of claim 1, wherein the sizes of the layers to be downloaded are derived from the manifest, wherein the sorted list is generated by sorting the layers by size in increasing and/or decreasing order.

4. The computer-implemented method of claim 1, in response to determining that the resource requirements are greater than the available resources, outputting an error.

5. The computer-implemented method of claim 1, wherein adjusting the optimal parallelism for downloading the layers includes increasing the optimal parallelism for relatively smaller layers, wherein increasing the optimal parallelism includes increasing the number of layers to be downloaded in parallel by a set number of layers at a time.

6. The computer-implemented method of claim 1, wherein adjusting the optimal parallelism for downloading the layers includes decreasing the optimal parallelism for relatively larger layers.

7. The computer-implemented method of claim 1, wherein adjusting the optimal parallelism for downloading the layers includes not increasing the optimal parallelism in response to one or more of the available resources becoming a bottleneck.

8. The computer-implemented method of claim 1, wherein the optimal parallelism is updated in response to completion of downloading at least one layer, wherein the at least one layer is removed from the sorted list in response to the completion of the download.

9. The computer-implemented method of claim 1, wherein the characteristics of available resources include a first computational capacity for downloading the layers of the container image, wherein the characteristics of the available resources include a second computational capacity for extracting the layers of the container image.

10. The computer-implemented method of claim 1, wherein the characteristics of available resources include storage space for storing the layers of the container image in an uncompressed form.

11. A computer program product for dynamically adjusting parallelism for pulling container images from container registries, the computer program product comprising a computer readable storage medium having program instructions embodied therewith, the program instructions executable by a computer to cause the computer to:

receive, by the computer, characteristics of available resources usable for downloading layers of a container image, wherein the available resources are compared to resource requirements for downloading the layers, wherein the characteristics include at least one characteristic selected from the group consisting of: a network bandwidth, computational capacity, storage available, and storage speed;

in response to determining that the resource requirements are less than or equal to the available resources, sort, by the computer, the layers by size for generating a sorted list;

fetch, by the computer, a manifest of the container image from a container registry, wherein the manifest of the container image includes metadata at least about the layers of the container image, sizes of the layers of the container image, digests, operating systems (OS), architectures, and runtime requirements;

determine, by the computer, layers of the container image to be downloaded based on the manifest, wherein the fetching and the determining are performed substantially simultaneously as the receiving the characteristics of available resources usable for downloading the layers of the container image;

based on the characteristics of the available resources and the sizes of the layers to be downloaded, adjust, by the computer, an optimal parallelism to download the layers, wherein adjusting the optimal parallelism reduces an amount of time to pull the container image from the container registry, wherein adjusting the optimal parallelism includes determining an optimal number of layers to download in parallel without causing a bottleneck to occur, wherein the optimal parallelism is adjusted in response to downloading a predefined number of the layers; and download, by the computer, the layers.

12. The computer program product of claim 11, wherein the layers to be downloaded are layers which are not locally available.

13. The computer program product of claim 11, wherein the sizes of the layers to be downloaded are derived from the manifest, wherein the sorted list is generated by sorting the layers by size in increasing and/or decreasing order.

14. The computer program product of claim 11, wherein the layers to be downloaded are determined from the container registry.

15. The computer program product of claim 11, comprising, in response to determining that the resource requirements are greater than the available resources, output, by the computer, an error.

16. The computer program product of claim 11, wherein adjusting the optimal parallelism for downloading the layers includes increasing the optimal parallelism for relatively smaller layers, wherein increasing the optimal parallelism includes increasing the number of layers to be downloaded in parallel by a set number of layers at a time.

17. The computer program product of claim 11, wherein adjusting the optimal parallelism for downloading the layers includes decreasing the optimal parallelism for relatively larger layers.

18. The computer program product of claim 11, wherein adjusting the optimal parallelism for downloading the layers includes not increasing the optimal parallelism in response to one or more of the available resources becoming a bottleneck.

19. A system, comprising:
a processor; and logic integrated with the processor, executable by the processor, or integrated with and executable by the processor, the logic being configured to:

receive characteristics of available resources usable for downloading layers of a container image, wherein the available resources are compared to resource requirements for downloading the layers, wherein the layers to be downloaded are layers which are not locally available, wherein the characteristics include at least one characteristic selected from the group consisting of: a network bandwidth, computational capacity, storage available, and storage speed;

in response to determining that the resource requirements are less than or equal to the available resources, sort the layers by size for generating a sorted list;

fetch a manifest of the container image from a container registry, wherein the manifest of the container image includes metadata at least about the layers of the container image, sizes of the layers of the container image, digests, operating systems (OS), architectures, and runtime requirements;

determine layers of the container image to be downloaded based on the manifest, wherein the fetching and the determining are performed substantially simultaneously as the receiving the characteristics of available resources usable for downloading the layers of the container image;

based on the characteristics of the available resources and the sizes of the layers to be downloaded, adjust an optimal parallelism to download the layers, wherein adjusting the optimal parallelism reduces an amount of time to pull the container image from the container registry, wherein adjusting the optimal parallelism includes determining an optimal number of layers to download in parallel without causing a bottleneck to occur, wherein the optimal parallelism is adjusted in response to downloading a predefined number of the layers; and download the layers.

20. The system of claim 19, wherein the available resources are compared to resource requirements for downloading the layers,
  in response to determining that the resource requirements are less than or equal to the available resources, sorting the layers by size; and
  in response to determining that the resource requirements are greater than the available resources, outputting an error.

* * * * *